J. W. SWAN.
Assignor, bv mesne assignments, to THE ELECTRICAL ACCUMULATOR COMPANY.
SECONDARY BATTERY
No. 11,047. Reissued Dec. 17, 1889.
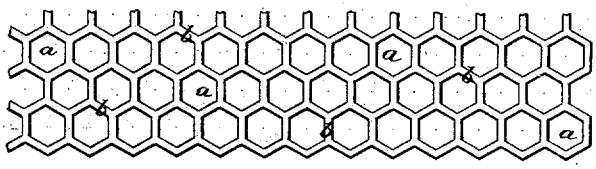
Witnesses
Geo. W. Breck.
Henry W. Lloyd.
Inventor
Joseph Wilson Swan,
By his Attorney
B. Kausing

UNITED STATES PATENT OFFICE.

JOSEPH WILSON SWAN, OF LAURISTON, BROMLEY, COUNTY OF KENT, ENGLAND, ASSIGNOR, BY MESNE ASSIGNMENTS, TO THE ELECTRICAL ACCUMULATOR COMPANY, OF NEW YORK.

SECONDARY BATTERY.

SPECIFICATION forming part of Reissued Letters Patent No. 11,047, dated December 17, 1889.

Original No. 312,599, dated February 17, 1885. Application for reissue filed October 16, 1889. Serial No. 327,225. Patented in England May 24, 1881, No. 2,272.

*To all whom it may concern:*

Be it known that I, JOSEPH WILSON SWAN, a subject of the Queen of Great Britain, formerly residing at Newcastle-upon-Tyne, in the county of Northumberland, England, now residing at Lauriston, Bromley, in the county of Kent, England, have invented certain Improvements in Secondary Batteries or Apparatus for Storing or Conserving Electricity, (for which I have obtained a patent in Great Britain, No. 2,272, dated May 24, 1881,) of which the following is a specification.

My said invention has for its object facilitating the construction of so called "secondary voltaic piles or batteries," and aims at the production of plates having surfaces more suitable for holding the active material, such as spongy lead or lead in a finely-divided form.

In carrying out my said invention I prepare plates with perforations, cells, or holes extending through the plates. and pack the active material or material to become active in the perforations or cells.

The accompanying drawing illustrates by way of example a plate constructed according to my said invention, the figure being a front elevation.

The plate is constructed with cells or cavities *a*, which extend through the plate and in which the active material—such as spongy or finely-divided lead—or the material to become active is packed.

It should be understood that the form of the cells may be greatly varied without departing from the principle of my said invention, the object being to obtain an interstitial construction of plate capable of affording a very large amount of acting surface in a small compass, and to prevent the coating of oxide or spongy lead from falling away from the plate, as it would from a plain vertical surface, unless held in position by some material external to the said coating.

When intended for use, a pair or a series of these plates may be placed in a suitable vessel and arranged and charged after the well-known manner of arranging and charging secondary piles or batteries, so as to act as a means for conserving or storing energy.

Having now described and particularly ascertained the nature of my said invention and the manner in which the same is or may be used or carried into effect, what I claim is—

A perforated or cellular plate for secondary batteries, having the perforations or cells extending through the plate and the active material or material to become active packed in the said perforations or cells only, substantially as described.

In testimony whereof I have signed my name to this specification in the presence of two subscribing witnesses.

JOSEPH WILSON SWAN.

Witnesses:

SYDNEY E. WOOD,

I. S. WALL,

*Both of 4 Gt. Winchester St., London, E. C.*